April 19, 1960     J. L. WEININGER     2,933,546
GALVANIC BATTERY
Filed Sept. 27, 1957

Inventor:
Joseph L. Weininger, by Paul A. Frank
His Attorney.

United States Patent Office 2,933,546
Patented Apr. 19, 1960

2,933,546
GALVANIC BATTERY

Joseph L. Weininger, Scotia, N.Y., assignor to General Electric Company, a corporation of New York Application September 27, 1957, Serial No. 686,660

8 Claims. (Cl. 136—86)

This invention relates to galvanic batteries and specifically to galvanic batteries which contain solid electrolytes.

Galvanic batteries which contain solid electrolytes are desirable as low current sources for electrical devices such as transistors, radiation meters, amplifiers, image tubes, exposure meters, and for the charging of capacitors. Although many galvanic batteries containing solid electrolytes are known to the art, the usual prior art battery is unsatisfactory for operation at elevated temperatures. Galvanic batteries required today must be usable at elevated temperatures, such as temperatures in excess of 150° C.

Accordingly, it is an object of the present invention to provide an improved galvanic battery.

A further object of the present invention is to provide a solid state battery which is operable at temperatures up to the temperature at which the solid electrolyte melts or decomposes.

Figure 1:
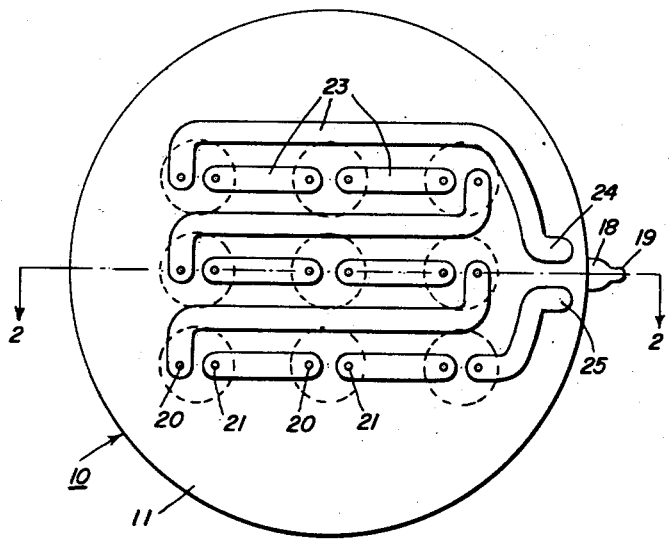
Figure 2:
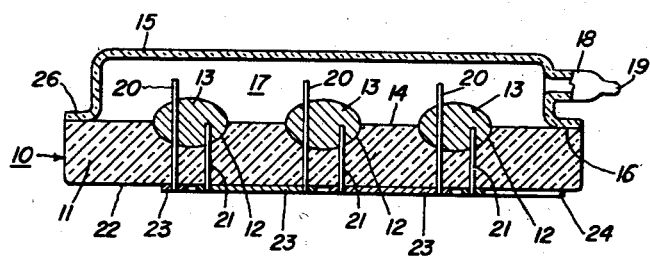

These and various other objects, features and advantages of the invention will be better understood from the following description taken in connection with the accompanying drawing in which Fig. 1 is a plan view of the base of a battery which embodies my invention and Fig. 2 is a sectional view along the line 2—2 of Fig. 1.

In Figs. 1 and 2 of the drawing a multiple cell battery which is indicated generally at 10 comprises a base member 11 which is formed of glass or ceramic material containing a plurality of recesses or bores 12. In each of recesses 12 is positioned a mass of silver halide 13 which completely fills the recess and which may extend above the plane of upper surface 14 of base 11. The casing 15, which is generally dish-shaped, is sealed to base 11 around the periphery 16 of base member 11 to define a space 17 which contains a halogen atmosphere. Casing 15 is provided with conduit 18 which is sealed at its terminus 19 so as to provide a gas-tight assembly. Inert metal electrodes 20 extend through base member 11 and silver halide masses 13 into space 17. A silver anode 21 extends through base member 11 and into, but not all the way through, each silver halide mass 13. Means are provided on surface 22 of base 11 for connecting inert electrodes 20 and silver anodes 21 in any desired circuit arrangement. In particular, a printed circuit arrangement is shown in Fig. 1, by which conductors 23, which are bonded to surface 22, connect inert electrodes 20 and silver anodes 21 in series arrangement. It is obvious that instead of providing printed circuit 23 to prepare a series arrangement, the circuit can also be connected so that inert electrodes 20 and silver anodes 21 are in parallel arrangement.

In the construction of the cells of the present invention a suitable glass or ceramic base member 11 is first formed with depressions 12 for silver halide masses 13 and with apertures through which inert electrodes 20 and silver anodes 21 may be inserted. There are a number of methods of preparing base member 11, the simplest of which comprises the casting of molten glass in the desired shape and subsequently allowing the glass to solidify with the recesses 12 therein and also with the apertures for electrodes 20 and anodes 21 therein. Where a clay-based ceramic material is used for base 11, the base is molded to the desired shape before firing and then subsequently fired to produce the final ceramic product. Base 11 can also be formed by irradiation of a photosensitive glass through a mask of proper configuration, with the subsequent etching away of the irradiated portion of the glass. After preparation of base 11, inert electrodes 20 and silver anodes 21 are inserted therein. The length of inert electrodes 20 is selected so that the electrode will extend below surface 22 of base 11 and will extend well into space 17. The length of anodes 21 is selected so that the anode will extend below surface 22 of base 11 but will not extend all the way through silver halide mass 13 which is subsequently added to the assembly. Neither the shape nor the cross-sectional area of electrodes 20 or anodes 21 are critical to the batteries of the present invention, any convenient size being employed. In the preferred embodiment of my invention both electrodes 20 and anodes 21 are formed of wire having a diameter of about 38 mils.

When electrodes 20 and anodes 21 are to be connected in the desired electrical manner by means of a printed circuit, it is convenient to apply the printed circuit at this point in the construction of battery 10. Since electrodes 20 and anodes 21 are already in place, the deposition of the printed circuit on the surface 22 will also insure good contact between electrodes 20 and anodes 21 and the material of the printed circuit. Printed circuit 23 may be formed by any of the well known prior art processes. A number of these methods are described in "Printed Circuit Techniques" by C. Brunetti and R. W. Curtis, National Bureau of Standards Circular 468, issued November 15, 1947. One very satisfactory method for applying the printed circuit 23 is by placing a mask over surface 22 with the mask having cutout portions corresponding to the desired printed circuit. The surface 12 is then briefly sandblasted and molten metal is sprayed onto the surface through the mask by conventional flame spraying techniques. Any metal may be used for printed circuit 23 which is an electrical conductor. The preferred material for printed circuit 23 is copper which is readily applied by flame spraying techniques. Other satisfactory metals for printed circuit 23 include gold, silver, and aluminum. In applying the printed circuit to surface 22, it is desirable to provide portions 24 and 25 which serve as leads to which the load operated by battery 10 may be connected.

Silver halide masses 13 are then positioned in recesses 12 by pouring the molten silver halide into recesses 12 or by placing a mass of powdered halide in recess 12 and applying a flame to the halide to cause sintering of the individual particles to form the final unitary mass 13. The amount of silver halide present in each of the masses 13 is not critical so long as sufficient halide is present to cover the ends of anodes 21. Casing 15, which is provided with peripheral flange 26, may then be attached to base 11 by any suitable means. One suitable means is by providing a cement layer (not shown) between flange 25 and periphery 16 of base 11. One suitable cement for this purpose can be prepared by mixing 2 parts, by weight, of aluminum silicate, 1 part, by weight, of freshly calcined aluminum phosphate, 2 parts, by weight, of fused quartz, and 2 parts, by weight, of a 50 percent aqueous solution of phosphoric acid to form a paste. This paste is applied to a flange 25 and periphery 16 and while holding flange 25 in contact with periphery 16, the entire assembly is heated at a temperature of about 125° C. to drive the water from the paste and form a rock-like cement which holds flange 25 to periphery 16 in gas-tight relationship.

To complete the assembly of battery 10, space 17 is filled with the desired amount of halogen. The halogen may be added to the cell in any desired means. Where the halogen employed is iodine, crystals of iodine may be inserted into space 17 through conduit 18 and the assembly may then be evacuated to the desired pressure, which is a pressure of from a few microns up to about 350 millimeters mercury. Upon obtaining the desired pressure in space 17, conduit 18 is then sealed at 19 by conventional means. Where bromine is the halogen in space 17, the desired amount of bromine may be added to the cell again by means of conduit 18. The amount of bromine added to space 17 is dependent on the volume of space 17 and sufficient bromine is added to the cell to provide the desired pressure at the desired operating temperature. Generally, sufficient bromine is added to space 17 to provide a pressure of from a few microns up to about 350 millimeters at a temperature near the melting point of the silver halide in the battery. Where chlorine or fluorine are employed as the halogen in space 17, space 17 is merely evacuated and then the desired amount of fluorine or chlorine is bled into the system and subsequently conduit 18 is sealed at 19.

In constructing the cells of the present invention the halide mass 13 can be formed of any of the silver halides. However, I prefer to employ silver iodide as the halide with a silver bromide also being particularly important. Once the material of silver halide mass 13 is selected the particular halogen in space 17 is fixed, since the halogen in space 17 is selected to correspond with the halogen of the silver halide. Thus, in the preferred embodiment of my invention, mass 13 is formed of silver iodide and space 17 contains iodine. Inert electrodes 20 may be formed of any metal which is inert to the cell reactants under the reactants at which the cell operates. The preferred materials of construction for electrodes 20 are tantalum and platinum. Both of these metals are readily available and neither is adversely affected by the halogen vapors or gas in space 17 or by the silver halide. Other metals which have the inert characteristics required for electrodes 20 include, for example, nickel, ruthenium, rhodium, palladium, osmium and iridium. The material of construction of casing 15 is also not critical to the present invention since any material which is inert to the halogen atmosphere in space 17 is satisfactory. In addition to glass and the various ceramics, casing 15 may also be formed of any of the metals enumerated as materials of construction for electrodes 20.

The battery of the present invention may be described generally as a gas activated solid electrolyte battery. The overall chemical reaction involved in the battery of the present invention is the conversion of silver from anodes 21 and halogen from space 17 to silver halide. This overall cell reaction is accomplished by the anode reaction which consists of the conversion of elemental silver to silver ions with the release of electrons and the cathode reaction which consists of the conversion of elemental halogen to halogen ions with the absorption of electrons. The anode reaction takes place at the interface between silver anodes 21 and silver halide masses 13 while the cathode reaction takes place at the interface between inert electrodes 20, silver halide masses 13, and elemental halogen which is in space 17.

The size of the various elements comprising cell 10 may vary within extremely wide limits. For example, insulating base 11 may be of almost any desired size consistent with the mechanical requirement that the base not collapse because of any pressure differentials which exist between space 17 and the surrounding atmosphere. Casing 15 is selected so that its peripheral size, including flange 26, is equal to the size of insulating base 11. The height of cover 15 may also vary without any particular limit. The shape of depressions or recesses 12 may also vary. For example, recesses 12 may have the general curvature shown in Fig. 2 or may be formed by forming a bore with sides perpendicular to surface 14. The size of the apertures through which electrodes 20 and anodes 21 extend through member 11 are selected so that a fairly tight fit exists.

The cells of the present invention are operable at a wide range of temperatures which include room temperature as well as temperatures up to the melting point of the particular silver halide mass 13 in the battery. For example, batteries constructed in accordance with the present invention with silver iodide as the electrolyte and with iodine as the halogen in space 17 are operable at room temperature up to a temperature of about 550° C., which is the decomposition point of silver iodide. These silver iodide batteries are particularly useful at temperatures of from about 150–550° C., because at this temperature the silver iodide exists in its alpha form, which form has an extremely high ionic conduction and therefore reduces the internal resistance of the batteries of the present invention below the internal resistance of iodine batteries operated below about 150° C. as well as below the internal resistance of other batteries employing halides other than the iodide.

As a particular illustration of the preferred embodiment of the present invention, a battery 10 is formed by drilling nine holes in a disk of quartz glass having a diameter of 2.0 inches and a thickness of ½ inch. Each of these holes is ¼ inch in diameter and ⅛ inch in depth. The sides and bottoms of these drilled holes form recesses 12. In the base of each of these drilled holes, two additional holes, 1/16 inch apart, are drilled with a drill having a diameter of 38 mils. These holes extend from the base of each recess 12 through base 11, forming a pair of apertures in the base of each recess 12. Thirty-eight mil tantalum wire is then inserted into one of the two apertures of each pair with the tantalum wire extending ¼ inch above surface 14 and about 1/64 inch below surface 22. Thirty-eight mil silver wire is then positioned in each of the remaining apertures in base 11 with the top of each silver wire extending to the plane of surface 14 with the base of each wire extending about 1/64 inch below surface 22. A stencil formed of masking tape is then placed over surface 22. This stencil has openings in it corresponding generally to the printed circuit 23 shown in Fig. 1. This assembly is then sandblasted along the exposed portions of surface 22 and copper is flame sprayed against the surface to a thickness of about 1/64 inch. Molten silver iodide is then poured into each of the recesses and forms a seal upon solidification between silver iodide masses 13 and base member 11, as well as forming seals around tantalum electrodes 20 and over silver anodes 21. A dished quartz cover provided with flanges and having a depth of about ½ inch and having an exhaust conduit is then cemented to the periphery 16 of base 11 employing the cement previously described. About 1 gram of iodine crystals is then added to space 17 through conduit 18 and the space 17 is then evacuated to a pressure of about 15 microns, at which time conduit 18 is sealed at 19 to provide a vacuum-tight assembly. At room temperature (about 25° C.), battery 10 with electrodes 20 and anodes 21 in series has an open circuit voltage of 6 volts and produced a short circuit current of 1 microampere. At a temperature of 200° C., this same cell has a short circuit current of 1000 microamperes and an open circuit potential of 6 volts.

When batteries similar to that described above are prepared with silver bromide as the electrolyte and bromine as halogen, an open circuit voltage of 9.5 volts is obtained with a short circuit current of 1 microamp at room temperature. When the battery contains silver chloride with chlorine as the halogen, the room temperature open circuit voltage is about 11 volts. When silver fluoride is employed as the electrolyte with fluorine as the halogen, an open circuit potential of about 17 volts is obtained at room temperature.

While other modifications of this invention and variations of the structure which may be employed within the scope of the invention have not been described, the invention is intended to include all such as may be embraced within the following claims.

What I claim as new and desire to secure by Letters Patent of the United States is:

1. A multiple cell battery comprising an insulating base member, a plurality of recesses in the first surface of said base member, a solid mass of silver halide embedded in each of said recesses, an inert metallic electrode extending through said base member and through each said mass, a silver anode extending through said base member and partially through each said mass, a housing member in gas-tight relationship with the periphery of said first surface of said base member and defining a gas-tight chamber adjacent said first surface of said base, said chamber containing a gaseous halogen, and means for connecting each electrode and each anode in the desired electrical relationship.

2. A multiple cell battery comprising an insulating base member, a plurality of recesses in the first surface of said base member, a solid mass of silver halide embedded in each of said recesses, an inert metallic electrode extending through said base member and through each said mass, a silver anode extending through said base member and partially through each said mass, a housing member in gas-tight relationship with the periphery of said first surface of said base member and defining a gas-tight chamber adjacent said first surface of said base, said chamber containing a gaseous halogen, and printed circuit means for connecting each electrode and each anode in the desired electrical relationship.

3. A multiple cell battery comprising an insulating base member, a plurality of recesses in the first surface of said base member, a solid mass of silver halide embedded in each of said recesses, an inert metallic electrode extending through said base member and through each said mass, a silver anode extending through said base member and partially through each said mass, means maintaining a gaseous halogen atmosphere adjacent said first surface of said base member, and means for connecting each electrode and each anode in the desired electrical relationship.

4. A multiple cell battery comprising an insulating base member, a plurality of recesses in the first surface of said base member, a solid mass of silver halide embedded in each of said recesses, an inert metallic electrode extending through said base member and through each said mass, a silver anode extending through said base member and partially through each said mass, means maintaining a gaseous halogen atmosphere adjacent said first surface of said base member, and means for connecting each electrode and each anode in the desired electrical relationship, the halogen of said halogen atmosphere corresponding to the halogen of said silver halide.

5. A multiple cell battery comprising an insulating base member, a plurality of recesses in the first surface of said base member, a solid mass of silver iodide embedded in each of said recesses, an inert metallic electrode extending through said base member and through each said mass, a silver anode extending through said base member and partially through each said mass, means maintaining a gaseous iodine atmosphere adjacent said first surface of said base member, and means for connecting each electrode and each anode in the desired electrical relationship.

6. A multiple cell battery comprising an insulating base member, a plurality of recesses in the first surface of said base member, a solid mass of silver bromide embedded in each of said recesses, an inert metallic electrode extending through said base member and through each said mass, a silver anode extending through said base member and partially through each said mass, means maintaining a gaseous bromine atmosphere adjacent said first surface of said base member, and means for connecting each electrode and each anode in the desired electrical relationship.

7. A multiple cell battery comprising an insulating base member, a plurality of recesses in the first surface of said base member, a solid mass of silver fluoride embedded in each of said recesses, an inert metallic electrode extending through said base member and through each said mass, a silver anode extending through said base member and partially through each said mass, means maintaining a gaseous fluorine atmosphere adjacent said first surface of said base member, and means for connecting each electrode and each anode in the desired electrical relationship.

8. A multiple cell battery comprising an insulating base member, a plurality of recesses in the first surface of said base member, a solid mass of silver chloride embedded in each of said recesses, an inert metallic electrode extending through said base member and through each said mass, a silver anode extending through said base member and partially through each said mass, means maintaining a gaseous chlorine atmosphere adjacent said first surface of said base member, and means for connecting each electrode and each anode in the desired electrical relationship.

References Cited in the file of this patent

UNITED STATES PATENTS

| | | |
|---|---|---|
| Re.24,408 | Hack et al. | Dec. 17, 1957 |
| 2,547,262 | Greenstein | Apr. 3, 1951 |
| 2,615,931 | Hatfield | Oct. 28, 1952 |
| 2,688,649 | Bjorksten | Sept. 7, 1954 |
| 2,690,465 | Broder | Sept. 28, 1954 |
| 2,778,754 | Shorr | Jan. 22, 1957 |